Patented Sept. 11, 1951

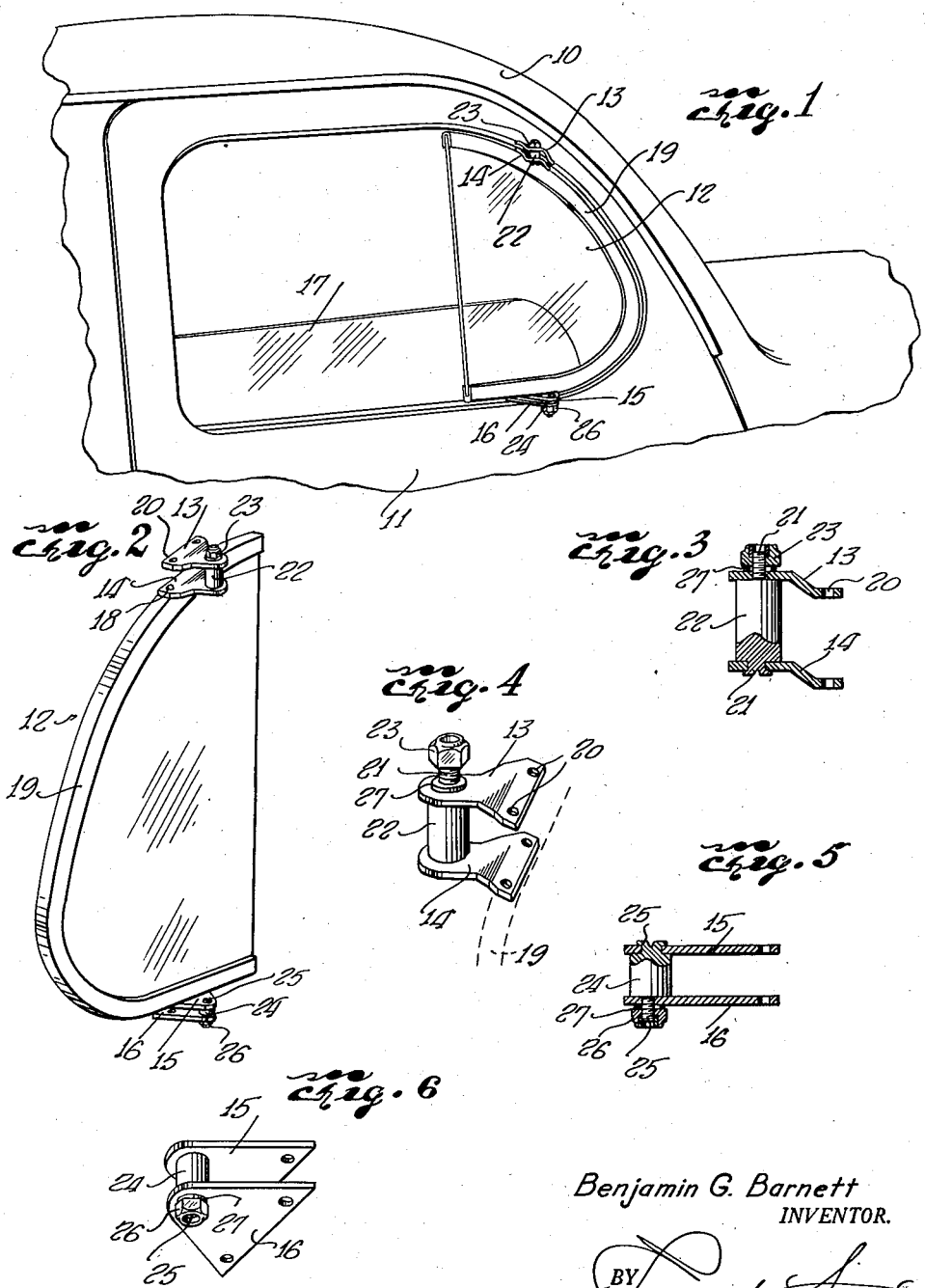

2,567,799

UNITED STATES PATENT OFFICE 2,567,799

VENTILATOR WING MOUNTING FOR TRUCK CABS

Benjamin G. Barnett, Dallas, Tex.

Application June 15, 1949, Serial No. 99,181

1 Claim. (Cl. 296—84)

This invention relates to automobile windows and it has particular reference to ventilator wings especially designed for use on trucks and other vehicles whose conventional equipment does not include these wings.

The principal object of the invention is to adapt the well known ventilator wing, long used on passenger vehicles, to the cab windows and doors of trucks in which the slidable glass panels conventionally occupy the full width of the door or window opening and as a consequence, fail to promote the comfort enjoyed by the occupants of passenger cars.

Another object of the invention is to provide a bracket effective to support the ventilator wing in exterior juxtaposition to the glass channel of the window or door, as the case may be, so that the ventilator may be swung into a variety of positions in relation to the glass panel opening and into parallelism with the plane of the glass panel when the latter is required to be raised and thus avoid interference with its operation. Moreover and of considerable importance is the provision of a friction sleeve embracing the pintles of the ventilator wing and against which bear lock nuts effective to resist tendency of the wings to become displaced under wind pressure or otherwise.

The objects will reveal themselves in the course of the following description, in conjunction with the annexed drawing wherein:

Figure 1 is a fragmentary view of a truck cab showing the ventilator wing of the invention installed thereon.

Figure 2 is a perspective view of a ventilator wing, per se showing the mounting brackets and friction elements thereon.

Figure 3 is a detail view partly in section, showing the upper mounting brackets and friction means of the ventilator.

Figure 4 is a perspective view of the assembly shown in Figure 3.

Figure 5 is a detail view, partly in section, showing the lower bracket and friction means assembly, and Figure 6 is a bottom perspective view of the assembly shown in Figure 5.

Continuing with a more detailed description of the drawing, reference numeral 10 denotes the cab of a truck, fragmentarily shown in Figure 1 and whose door 11 is conventionally unequipped with side ventilators of the type generally installed in the glass panel opening of the windows and doors. As is well known, the ventilator wings provide a medium by which a controlled volume of air may be admitted into the cab to lend comfort to the driver and passenger of the truck.

A ventilator wing 12 is provided, not unlike the conventional ventilator long used on passenger vehicles but in order to so mount the wing 12 on a truck that it will not interfere with normal movements of the slidable glass panel of the door, the wing must be spaced from the glass channel, preferably on the outside and further, that provision be made to adequately insure against displacement of the wing, which is frequently subjected to exceptionally high wind pressures.

To accomplish the foregoing, a mounting is provided consisting of two complementary brackets 13 and 14, pivotally supporting the wing at the top and two complementary brackets 15 and 16 which support the lower pivot of the wing in axial alignment with the upper pivot. In view of the wide range of truck body and cab designs, the brackets 13, 14, 15 and 16 may assume a variety of different shapes to accommodate them to the different cabs but in one particular, the brackets are the same in that both the top and bottom sets of brackets must be relatively disposed to offset or space the pivotal point of the wing 12 in relation to the channel in which the glass panel 17 of the cab is adapted to operate.

The lowermost bracket 14 of the top assembly is riveted or otherwise affixed at 18 to the partial frame 19 of the ventilator wing 12 while its companion bracket 13 is provided with apertures 20 to receive rivets or screws by which it is affixed in an appropriate position on the door 11 of the cab. It is apparent that the peculiar shape of the brackets determine the position of the wing 12 in relation to the door and must be formed so that the pivotal axis of the wing be perpendicular to the bottom of the panel opening in the door.

The brackets 13 and 14 extend outwardly from the door and each has an opening to receive the axial pins 21 of a cylindrical spacing member 22, interposed between the outer ends of the brackets 13 and 14. The lower pin 21 of the spacing member 22 is peened or expanded to secure the same permanently to the lower of the upper brackets while the upper pin is threaded to receive a lock nut 23.

The lower bracket assembly is not unlike the upper assembly in that it includes a spacing element 24, although the latter is of shorter length than the corresponding spacing element 22 of the upper assembly. The spacer 24 has upper and lower pivot pins 25 and in this case, the upper pin is peened and secured permanently to the uppermost of the lower brackets. The lower pin is threaded and carries a lock nut 26.

From the foregoing, it is apparent that the ventilator wing 12 may be moved to any desired angular position in the glass panel opening of the door 11 while the glass 17 is in lowered position and during periods when the glass is raised, the wing 12 must be moved into parallelism therewith, as shown in Figure 1. In any case, the wing 12 is positively secured in adjusted positions by tightening the nuts 23 and 26 which being lock nuts, will not become loose after being tightened. A split washer 27 against which each nut bears will hold the wing under sufficient friction that it may be adjusted without always requiring manipulation of the nuts 23 and 26.

Manifestly, the construction as shown and described is capable of some modification and such modification as may be construed to fall within the scope and meaning of the appended claim is also considered to be within the spirit and intent of the invention.

What is claimed is:

A side ventilator for a truck cab comprising a single wing mounted for oscillative displacement on an axis parallel to the glass panel opening of the door of said cab; top and bottom mounting members, each comprising a pair of parallel brackets, one of which is affixed to the door of said cab and extends outwardly therefrom, the other of said brackets being affixed to said wing, a cylindrical spacing member interposed between the outer ends of said pair of brackets and having a threaded pin extending from one end thereof through one of said pair of brackets and having its other end directly peened to the other of said pair of brackets; and means on said pin bearing against the respective bracket of the pair for frictionally holding said wing against displacement from adjusted positions.

BENJAMIN G. BARNETT.

REFERENCES CITED

The following references are of record in the file of this patent:

UNITED STATES PATENTS

| Number | Name | Date |
|---|---|---|
| 2,030,866 | Harris | Feb. 18, 1936 |
| 2,062,483 | Thorp | Dec. 1, 1936 |
| 2,105,936 | Tibbetts | Jan. 18, 1938 |